Sept. 16, 1947. M. TYKESON 2,427,427
SHOCK ABSORBER
Filed Sept. 19, 1945

INVENTOR.
Martin Tykeson
BY
ATTORNEY.

Patented Sept. 16, 1947

2,427,427

UNITED STATES PATENT OFFICE 2,427,427

SHOCK ABSORBER

Martin Tykeson, Hamden, Conn.

Application September 19, 1945, Serial No. 617,249

5 Claims. (Cl. 188—129)

This invention relates to improvements in shock absorbers, particularly adapted for attachment to vehicle and other devices wherein the approach and withdrawal of associated elements is desired without abrupt and sudden movement thereof.

One object of this invention is to provide an improved shock absorber of the above type in which an axial thrust may be imposed upon a rotatable member to rotate it and to move it axially due to its rotation, and means to control the rotation of the member.

Another object is to provide in a shock absorber an axially movable rotatable member disposed within a casing and normally maintained in an intermediate position lengthwise of the casing.

A further object of this invention is to provide an improved shock absorber which will be relatively inexpensive to manufacture, simple in construction, of few parts, pleasing in appearance, compact, and very efficient and durable in use.

With the above and other objects in view which will appear as the description proceeds, there has been illustrated in the accompanying drawings a form in which the features and principles of this invention may be conveniently and practically embodied.

Figure 1:
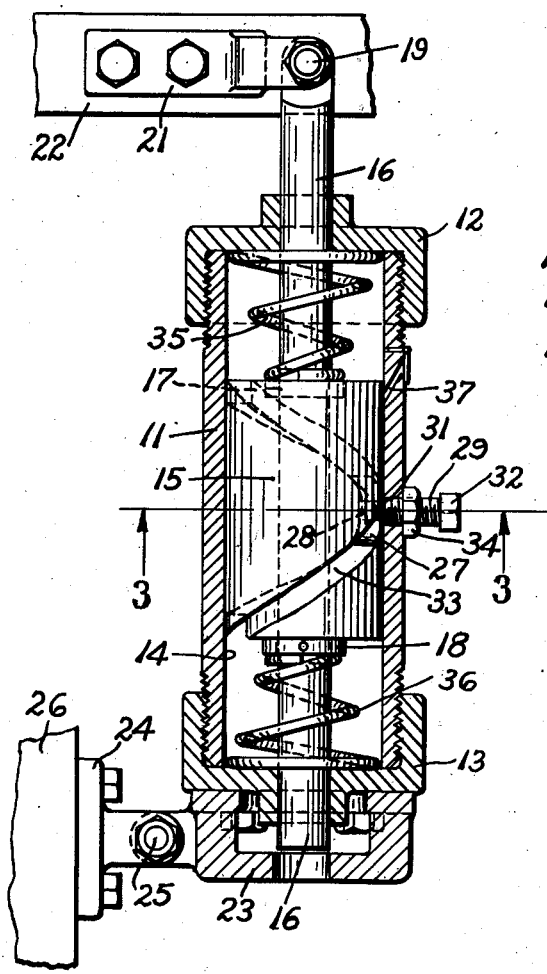
Figure 1 is a longitudinal sectional view of a shock absorber embodying the features and principles of this invention.
Figure 3:
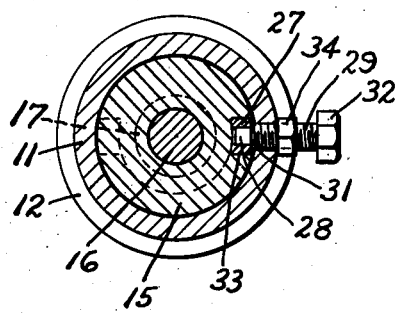
Figure 3 is a sectional view taken on the line 3—3 of Figure 1.
Figure 2:
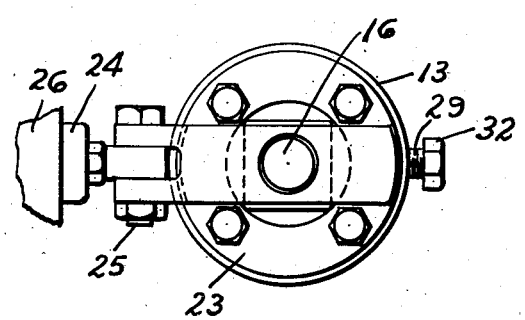
Figure 2 is a bottom view thereof.

Referring now to the drawings, wherein like reference numerals designate like elements throughout the several views, the numeral 11 denotes a hollow casing body having end closure members 12 and 13. In the form shown, the casing body 11 is tubular and the end closure members 12 and 13 are caps screw threaded onto the upper and lower ends of the casing body respectively. The casing body 11 is provided with a circular bore 14 in which a cylindrical rotor 15 is disposed for free sliding movement axially thereof.

The rotor 15 is mounted on a shaft 16, for free rotation relatively thereto, and is secured against axial movement on the shaft by an annular rib 17 and a collar 18 both affixed to the shaft 16, one at each end of the rotor 15. The shaft 16 extends through the casing body 11, and extends through and is supported by both of the end closure members 12 and 13. The shaft extension beyond the closure member 12 is shown pivotally connected by a bolt 19 to a bracket 21, which is affixed to an element 22, which element 22 may be the body of a vehicle, or a connected part thereof. The end closure member 13 is shown connected to a bracket 23 which is pivotally connected to a bracket 24 by a bolt 25. The bracket 24 is indicated as being secured to an element 26, which element 26 may be the axle support of a vehicle.

A shoe 27 is supported on a stud 28 formed on the end of a screw 29 which is screw threaded through the wall of the casing body 11 intermediate its ends. A shoulder 31, provided on the screw 29, engages the shoe 27 whereby rotation of the screw, by means of its head 32, may force the shoe inwardly against the rotor 15. In this instance, the shoe 27 rides in a spiral groove 33 formed in the periphery of the rotor 15, and inward pressure on the shoe 27 will force it into firmer frictional engagement with the rotor at the bottom of the groove 33. A lock nut 34 is provided to lock the screw 29 in its shoe adjusted position.

The rotor 15 is disposed in the casing body 11 substantially central between the ends of the body 11 and is normally maintained in such position by cone shaped coiled springs 35, respectively disposed to react between one of the rotor ends and the upper closure member 12 and between the other rotor end and the lower closure member 13. An oil hole 37 is provided in the casing body 11 by which the bearing surfaces in the interior thereof may be lubricated.

Under normal conditions the elements illustrated will be in the positions shown in Figure 1. Should a sudden shock be downwardly imposed upon the element 22 (the vehicle body), the shaft 16 will have a downward thrust imposed thereon which will be transmitted to the rotor 15 through the rib 17. This downward thrust upon the rotor 15 will cause it to rotate upon the shaft 16, due to the action of the shoe 27 thereon in the spiral groove 33. The rapidity of such rotation of the rotor 15 will be controlled by the amount of friction imposed on the rotor by the shoe 27, as adjusted by the screw 29. Rotation of the rotor 15, as above described, will move it axially in the casing body 11, compressing the spring 36. The sudden shock thus imposed upon the element 22 will be absorbed and not transmitted to the element 26 (the vehicle axle).

In like manner, a sudden shock upwardly imposed on the element 26, (the vehicle axle) will be absorbed and not transmitted to the element 22. In such instance the casing body 11 will have an upward thrust imposed thereon which will be transmitted to the rotor 15 by the shoe 27 to rotate the rotor 15 upon the shaft 16, and thus move it axially downwardly in the casing body, compressing the spring 36.

A reversal of the directions of the abrupt shocks, that is, upwardly on the element 22 and downwardly on the element 26 will reverse the direction of the thrust on the rotor 15 and cause it to move axially toward the upper end of the casing body 11, compressing the spring 35. Upon the release of any of the above imposed thrusts, the springs 35 and 36 will act upon the rotor 15 to move it into its normal position intermediate the ends of the casing body 11. By varying the frictional engagement of the shoe 27 upon the rotor 15 within the groove 33 by means of the screw 29, the action of the shock absorber may be adjusted as desired.

While there has been shown and described herein one form in which the features and principles of this invention may be embodied in practice it will be understood that the same may be embodied in other specific forms without departing from the spirit and essential attributes thereof, and it is therefore desired that the present embodiment be considered in all respects as illustrative and not restrictive, reference being had to the claims rather than to the foregoing description to indicate the scope of the invention.

Having thus fully described the invention, what is claimed as new and for which it is desired to secure Letters Patent, is:

1. In a shock absorber, a casing having end closure members, a shaft extending through said casing and journaled in each of said members, a rotor slidable axially in said casing and mounted for free rotation on said shaft, a coiled spring reacting between each closure member and an end of said rotor to normally centralize it in said casing, said rotor having a spiral groove formed in its periphery, and a shoe secured to said casing and adapted to ride in said groove in frictional engagement with said rotor to rotate the rotor on said shaft when the rotor is moved lengthwise in the casing.

2. In a shock absorber, a casing having end closure members, a shaft extending through said casing and journaled in said members, a rotor having a spiral groove in its periphery disposed in said casing to slide axially therein and mounted on said shaft for free rotation thereon, a cone-shaped spring coiled about said shaft in each end of said casing and reacting between a closure member and said rotor, and a shoe secured to said casing and riding in the groove in said rotor in frictional engagement with said rotor to rotate said rotor upon movement of the rotor axially in said casing.

3. In a shock absorber, a casing having end closure members, a shaft extending through said casing and journaled in said members, a rotor having a spiral groove in its periphery disposed in said casing to slide axially therein and mounted on said shaft for free rotation thereon, a cone-shaped spring coiled about said shaft in each end of said casing and reacting between a closure member and said rotor to normally maintain the rotor central lengthwise of said casing, a shoe secured to and extending into said casing intermediate the ends thereof and riding in the groove in said rotor in engagement therewith to rotate the rotor on said shaft upon movement of said rotor axially in said casing, and means to secure said shoe to said casing and actuated from the outside of said casing to vary the frictional engagement of said shoe with said rotor.

4. In a shock absorber, a casing having end closure members one of said members being adapted to be secured to a vehicle element movable relatively to another vehicle element, a shaft extending through said casing and journaled in said end members and being adapted to be connected to the other vehicle element, a rotor having a spiral groove in its peripheral surface, disposed in said casing intermediate its ends and axially slidable therein, said rotor being rotatably mounted on said shaft, a cone-shaped spring coiled about the shaft at each end of said rotor and reacting between it and an end closure member to normally maintain the rotor intermediate the ends of said casing, when the vehicle elements are at rest, and a shoe secured to and extending into the casing intermediate its ends and into the spiral groove in said rotor in frictional engagement therewith and intermediate its ends to rotate the rotor when the vehicle elements move relatively toward and away from each other and thus absorb the shock of such movement.

5. In a shock absorber, a casing having a cylindrical bore, an end closure member on each end of said casing, one of said members being adapted to be secured to a vehicle element movable toward and away from another vehicle element, a shaft extending through the casing and journaled in each end closure member, said shaft being adapted to be connected to the other vehicle element, a cylindrical rotor in said casing and freely slidable axially therein, said rotor having a spiral groove in its peripheral surface, the groove making but one turn in the length of said rotor, said rotor being freely rotatable on said shaft, means to secure said rotor to said shaft against axial movement thereon, a shoe extending into and along the groove in said rotor, means to connect said shoe to said casing intermediate the ends of the latter, and a cone-shaped spring coiled about the shaft at each end of the rotor and reacting between it and the adjacent end closure member, said springs being substantially equally tensioned to normally maintain the rotor in a central position in the casing between its ends.

MARTIN TYKESON.

REFERENCES CITED

The following references are of record in the file of this patent:

UNITED STATES PATENTS

| Number | Name | Date |
|---|---|---|
| 575,016 | Towne | Jan. 12, 1897 |
| 1,068,644 | Fullenlove | July 29, 1913 |
| 1,742,003 | O'Connor | Dec. 31, 1929 |